United States Patent [19]

Taylor

[11] Patent Number: 5,241,982
[45] Date of Patent: Sep. 7, 1993

[54] TAMPER-EVIDENT CAP FOR SECURING REFRIGERANT SERVICE PORTS

[76] Inventor: David W. Taylor, 216 Cotten Rd., Sanford, N.C. 27330

[21] Appl. No.: 915,248

[22] Filed: Jul. 20, 1992

[51] Int. Cl.⁵ ............................................. F16K 35/00
[52] U.S. Cl. .................................. 137/384; 292/307 R; 285/80
[58] Field of Search ............... 137/384, 383; 222/153, 222/541; 292/307 R, 325; 70/50; 285/80

[56] References Cited

U.S. PATENT DOCUMENTS

| | | | |
|---|---|---|---|
| 1,022,045 | 4/1912 | Phelps . | |
| 1,526,301 | 2/1925 | Stevens . | |
| 1,896,706 | 2/1933 | Grimes | 137/384 |
| 2,299,183 | 10/1942 | Shanor | 285/80 X |
| 2,599,472 | 6/1952 | Miller | 220/375 |
| 3,588,963 | 6/1971 | Moberg | 24/16 PB |
| 4,307,903 | 12/1981 | Wallace | 285/114 |
| 4,318,495 | 3/1982 | Wood | 220/375 |
| 4,586,570 | 5/1986 | Swift | 169/75 |
| 4,651,901 | 3/1987 | Ozdemir | 222/153 |
| 4,817,450 | 4/1989 | Jachim | 73/886.5 |

FOREIGN PATENT DOCUMENTS 2322286  4/1977  France ............................... 24/16 PB Primary Examiner—Martin P. Schwadron
Assistant Examiner—Kevin L. Lee
Attorney, Agent, or Firm—Harry Williams

[57] ABSTRACT

A tamper-evident cap structure cooperates with a one-way, anti-disconnect strap so that the cap can be screwed onto or secured to the service port of an air-conditioning system, and the anti-disconnect strap can be then looped around both the cap and the refrigerant flow pipe supporting the service port. The anti-disconnect strap can form a permanent part of the cap, or it can be removably secured to the cap; in either case unauthorized entry is indicated by the need to break or sever the strap. Also provided with the anti-disconnect strap is an identity tag upon which the identity of the service organization and date of service can be recorded when a new cap-and-strap assembly is used.

6 Claims, 1 Drawing Sheet

U.S. Patent     Sep. 7, 1993     5,241,982
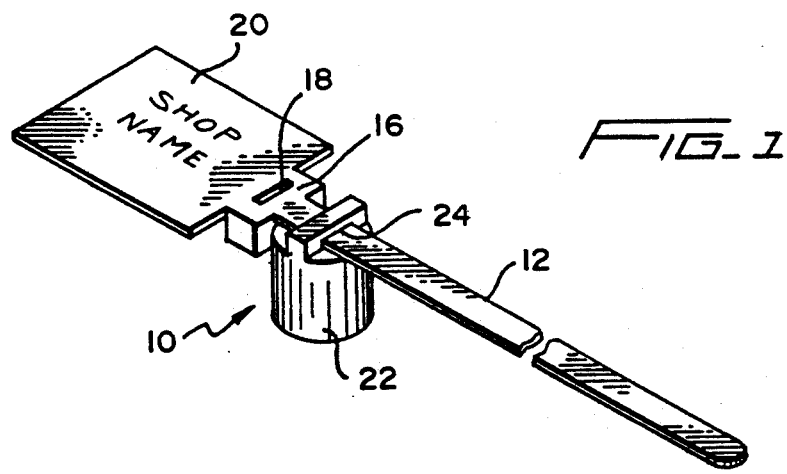
FIG_1
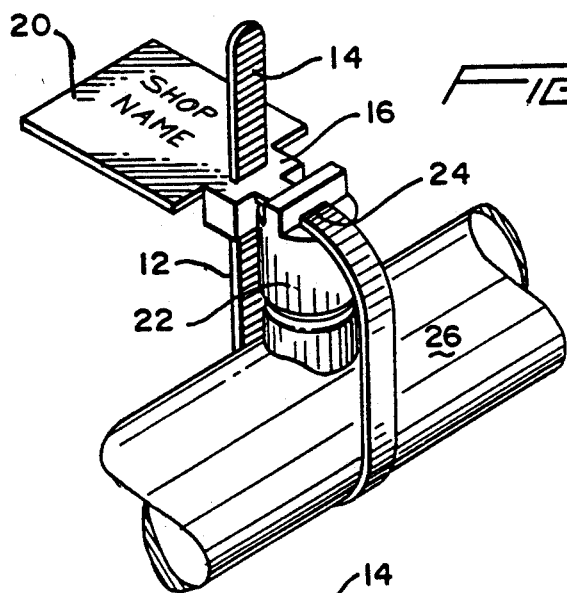
FIG_2
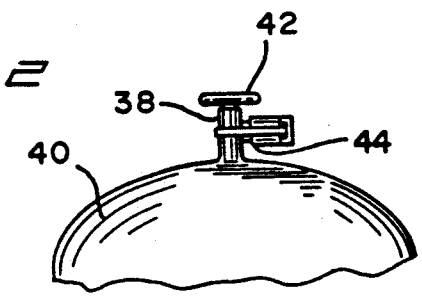
FIG_5
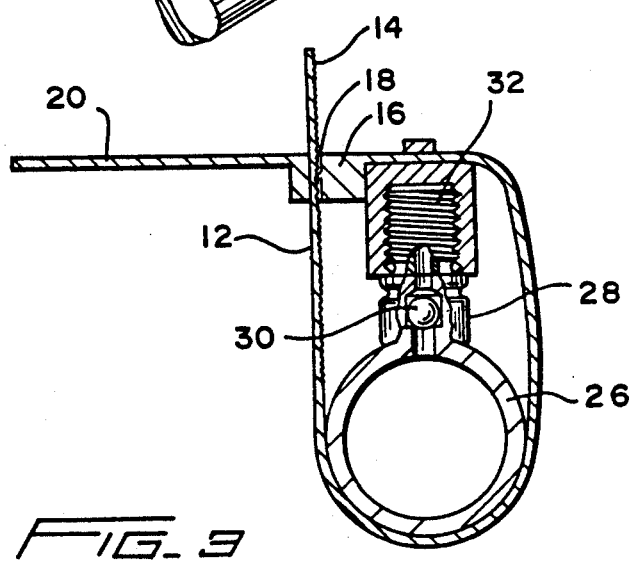
FIG_3
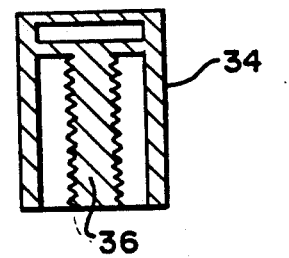
FIG_4

TAMPER-EVIDENT CAP FOR SECURING REFRIGERANT SERVICE PORTS

BACKGROUND OF THE INVENTION

This invention relates to tamper evident caps in general and particularly to such caps that can have utility for refrigerant service ports.

Refrigerant service ports are commonly found in airconditioning systems used in automobiles and homes in which such systems require replenishment of a refrigerant from time to time. The service ports so provided for this purpose are usually screw-threaded, check-valve devices secured to a refrigerant flow pipe in some easily accessible area so that a supply hose associated with a supply container of refrigerant can be secured—that is, screw-threaded—to the service port, and the pressurized refrigerant in the container can then be transferred to the empty system. Because these service ports are accessible and since the refrigerant itself may have a high market value—owing to market forces and the cost of environmental protective measures—such service ports, whether located on a system's flow pipes or on the refrigerant supply container itself, are vulnerable to unauthorized entry, so that theft or even inadvertent loss of the refrigerant from such systems are possible. It is evident, then, that such service ports as described above become the weak link in the chain of security between the supplier and the consumer.

OBJECTS AND SUMMARY OF THE INVENTION

It is a primary purpose and principle object of the present invention to address the aforementioned situation and provide a needed measure of security for refrigerant-containing systems that will help prevent the unauthorized removal of a refrigerant from such systems.

It is a further object of the invention to provide a simple and inexpensive tamper-evident structure for securing the service ports used in refrigerant-containing systems, whether such systems are portable or in place.

It is yet another object of the invention to provide a tamper-evident structure for securing a service port on the refrigerant-flow pipe of an air-conditioning system for either a car or a home that will immediately show to the owner of such a system whether or not unauthorized entry has taken place.

It is still a further object of the invention to provide a simple and inexpensive tamper-evident structure that is disposable and that can be used with any service port that provides access for a refrigerant fluid, whether such refrigerant is contained in a supply container or in an air-conditioning system.

According to one embodiment of the invention there is provided a screw-on cap structure cooperating with a one-way, anti-disconnect lock strap by which the cap is readily screwed onto the service port, thus securing same, and the associated strap is looped around both the cap and the refrigerant flow pipe supporting the service port. The lock strap is secured in place by the anti-disconnect locking aperture associated with it. The strap can form a permanent part of the cap, in which case the cap and strap can be replaced as a unit, or the strap can be removably secured to the cap so that the cap can be re-used with a new strap when a service port is re-secured after a servicing operation. Also provided with the lock strap is an identity tag upon which the identity of the service organization and date of service can be recorded.

The invention will be better understood as well as further objects and advantages thereof become more apparent from the ensuing detailed description taken in conjunction with the drawings.

BRIEF DESCRIPTION OF THE DRAWINGS

FIG. 1 is a schematic perspective view of the tamper-evident assembly according to the invention;

FIG. 2 is a schematic perspective view of the tamper-evident assembly secured in place with a service port and fluid-flow pipe, according to the invention; FIG. 3 is a schematic cross-sectional view of the tamper-evident assembly shown in FIG. 2;

FIG. 4 is a schematic cross-sectional view of another embodiment of the cap used in the tamper-evident assembly according to the invention; and FIG. 5 is schematic elevational view of a refrigerant supply tank in which the tamper-evident assembly according to the invention is secured to a service port associated with the tank.

DETAILED DESCRIPTION

Referring now to FIGS. 1 and 2, there is shown the tamper-evident assembly 10 according to the invention, which assembly includes a flexible strap 12 suitably of plastic material and of know design that has serrations 14 along one side thereof (see FIG. 2) and a suitable one-way, anti-disconnect locking element 16 near one end thereof and having an aperture 18 that cooperates with the serrations on the plastic strap in a known manner. Such a strap per se is shown in U.S. Pat. No. 3,588,963, which patent is incorporated herein by reference. A name-tag 20 is also connected to one end of the strap, upon which the name of the servicing organization which uses the assembly can be recorded. A screw-threaded cap 22 has its closed top portion secured to the strap 12 by means of a slot 24 located on the cap's top through which the strap can pass. Or the strap 12 can be molded to the cap in a single molding operation for producing both cap and strap as a single replaceable unit.

Further provided is a fluid-flow pipe 26 which forms part of an air-conditioning system (not shown). Such systems can be part of an automobile engine or part of a home heating-cooling system, such as a heat pump. The pipe 26 in such systems normally is equipped with a service port 28 that includes a conventional check-valve arrangement 30 as well as a threaded exterior 32 the service port 28 admits a refrigerant when opened by the proper tool, usually, a valve opening member associated with a threaded nipple of a suitable supply hose. Of course, refrigerant already in the system can be removed via the service port once the valve is opened, whether by authorized or unauthorized means, since the service port, like a tire valve, is freely accessible. The purpose of the invention, of course, is to prevent such unauthorized entry into the service port. As shown in FIG. 3, therefore, the strap 12 is looped around both the cap to which it is attached and the refrigerant-flow pipe 26. The free end, then, is inserted into the aperture 18 of the locking element 16 and pulled tight. The only way, then, to gain access to the service port is by breaking or severing the strap 12, which, if done by an unauthorized person, will show that it has been tampered with, that is, broken, and if by an authorized person, will then be replaced by a new strap and cap assembly, once servicing is finished. The name of the servicing organization and the date of servicing can be recorded on the tag 20.

FIG. 4 shows a cap designed for a different type of service port 34 in which the interior of the cap is provided with a threaded post 36 for threaded engagement with a service port having threads on the interior rather than the exterior of the stem portion.

FIG. 5 shows a fluid-flow pipe 38 attached to a refrigerant supply container 40. The pipe 38 has a valve handle 42 at one end, and at its intermediate portion supports a service port 44, similar in design to that shown in FIG. 3. The cap-and-strap assembly 10 is secured to the pipe and service port arrangement shown in FIG. 5 in the same manner as shown in FIG. 3.

It is also contemplated by the invention that the cap 22 not be threaded, that is, not have a threaded wall portion but have smooth exterior and interior walls so that the same need only be pressed onto the service port 28 in a snug-fit manner and be secured in place by the lock strap 12, as above described.

The foregoing relates to preferred exemplary embodiments of the present invention, it being understood that other embodiments and variants thereof are possible within the scope of the invention, the latter being defined by the appended claims.

What is claimed and desired to be secured by Letters Patent of the United States is:

1. A tamper-evident assembly for preventing unauthorized access to a service port for a fluid, comprising
   a fluid-flow pipe connected to and supporting said service port,
   a cap means for engaging and covering said service port,
   strap means having a locking means thereon for receiving in one direction a portion of said strap means to thereby form a loop of said strap means adjustable only in said one direction,
   said strap means having a portion thereof connected to said cap means, and
   said strap means extending around said cap means and said fluid-flow pipe and having its free end extending through said locking means so that said service port, said cap means and said fluid-flow pipe are contained within said loop, whereby said service port is not accessible unless said strap means is broken.

2. A tamper-evident assembly according to claim 1, wherein said fluid flow-pipe conveys a refrigerant for an air-conditioning system.

3. A tamper-evident assembly according to claim 1, wherein said service port includes a check valve means.

4. A tamper-evident assembly according to claim 1, wherein said strap means further includes a name-tag identity means connected thereto.

5. A tamper-evident assembly for preventing unauthorized access to a service port for a fluid, comprising
   a fluid-flow pipe connected to and supporting said service port,
   said service port having a threaded portion,
   a cap means having threaded means engaging said threaded portion of said service port for engaging said service port and covering same,
   a strap means having a locking means thereon for receiving in one direction a portion of said strap means to thereby form a loop of said strap means adjustable only in said one direction,
   said strap means having a portion thereof connected to said cap means, and
   said strap means extending around said cap means and said fluid-flow pipe and having its free end extending through said locking means so that said service port, said cap means and said fluid-flow pipe are contained within said loop, whereby said service port is not accessible unless said strap means is broken.

6. A method for securing a service port connected to a fluid-flow pipe by means of an integral strap-and-cap assembly having a locking means thereon for said strap, comprising the steps of,
   securing said cap to said service port for covering same,
   wrapping said strap connected to said cap around said cap and said fluid-flow pipe, and
   securing the free end of said strap in said locking means on said strap for forming and locking said strap into a loop surrounding said cap and said fluid-flow pipe.

* * * * *